(12) United States Patent
Tokushima (10) Patent No.: US 12,449,788 B2
(45) Date of Patent: Oct. 21, 2025

(54) PROSTHESIS SHAPE DATA GENERATION SYSTEM

(71) Applicant: INSTALIMB, INC., Tokyo (JP)

(72) Inventor: Yutaka Tokushima, Tokyo (JP)

(73) Assignee: INSTALIMB, INC., Tokyo (JP)

( * ) Notice: Subject to any disclaimer, the term of this patent is extended or adjusted under 35 U.S.C. 154(b) by 560 days.

(21) Appl. No.: 16/765,921

(22) PCT Filed: Nov. 20, 2018

(86) PCT No.: PCT/JP2018/042889
§ 371 (c)(1),
(2) Date: May 21, 2020

(87) PCT Pub. No.: WO2019/103010
PCT Pub. Date: May 31, 2019

(65) Prior Publication Data
US 2020/0356073 A1    Nov. 12, 2020

(30) Foreign Application Priority Data

Nov. 21, 2017    (JP) .................................. 2017-223984

(51) Int. Cl.
*G05B 19/4099* (2006.01)
*A61F 2/76* (2006.01)
(Continued)

(52) U.S. Cl.
CPC ............ *G05B 19/4099* (2013.01); *A61F 2/76* (2013.01); *A61F 2/80* (2013.01); *B33Y 30/00* (2014.12);
(Continued)

(58) Field of Classification Search
CPC ...... G05B 19/4099; G05B 2219/35134; G05B 2219/49023; B33Y 30/00; B33Y 50/02;
(Continued)

(56) References Cited

U.S. PATENT DOCUMENTS

| 8,366,789 B2 | 2/2013 | Summit |
| 2007/0233267 A1 | 10/2007 | Amirouche et al. |

(Continued)

FOREIGN PATENT DOCUMENTS

| JP | H731638 A | 2/1995 |
| JP | 2000090272 A | 3/2000 |

(Continued)

OTHER PUBLICATIONS

1 Notice of Reasons for Refusal in corresponding JP application 2019555318 dated Apr. 7, 2021 (pp. 1-4).
(Continued)

*Primary Examiner* — Santosh R Poudel
(74) *Attorney, Agent, or Firm* — Millen, White, Zelano & Branigan; Ryan R. Pool (57) ABSTRACT

To quickly and economically manufacture a prosthesis that fits the shape of a stump of a prosthesis user. A prosthesis shape data generation system provided includes: a stump shape data acquisition unit that acquires stump shape data, which is shape data on a stump of a living body; and an estimated prosthesis shape data generation unit that performs an estimation processing by inputting the stump shape data to a machine learning model that has previously learnt a correspondence between a stump shape and a shape of a part or a whole of a prosthesis that fits the stump shape, thereby generating estimated prosthesis shape data that is shape data on a part or a whole of a prosthesis that fits the stump of the living body.

6 Claims, 6 Drawing Sheets

(51) Int. Cl.
| | |
|---|---|
| *A61F 2/80* | (2006.01) |
| *B33Y 30/00* | (2015.01) |
| *B33Y 50/02* | (2015.01) |
| *B33Y 80/00* | (2015.01) |
| *G06F 30/10* | (2020.01) |
| *G06F 30/27* | (2020.01) |
| *G16H 50/20* | (2018.01) |
| *A61F 2/50* | (2006.01) |
| *G06Q 50/04* | (2012.01) |

(52) U.S. Cl.
CPC ............ *B33Y 50/02* (2014.12); *B33Y 80/00* (2014.12); *G06F 30/10* (2020.01); *G06F 30/27* (2020.01); *G16H 50/20* (2018.01); *A61F 2002/505* (2013.01); *A61F 2002/762* (2013.01); *G05B 2219/35134* (2013.01); *G05B 2219/49023* (2013.01); *G06Q 50/04* (2013.01)

(58) Field of Classification Search
CPC ......... B33Y 80/00; G16H 50/20; G06F 30/10; G06F 30/27; A61F 2/76; A61F 2/80; A61F 2002/505; A61F 2002/762; G06Q 50/04
See application file for complete search history.

(56) References Cited

U.S. PATENT DOCUMENTS

| | | | | |
|---|---|---|---|---|
| 2010/0023149 | A1* | 1/2010 | Sanders | A61F 2/80 700/98 |
| 2011/0161058 | A1* | 6/2011 | Schottdorf | G06T 17/00 703/1 |
| 2012/0282567 | A1* | 11/2012 | Nilsson | A61C 13/0004 433/68 |
| 2012/0284000 | A1* | 11/2012 | Nilsson | A61C 13/08 703/11 |
| 2014/0149082 | A1* | 5/2014 | Sanders | A61F 2/5046 703/1 |
| 2014/0163697 | A1* | 6/2014 | Sanders | G06F 30/00 623/36 |
| 2014/0300907 | A1 | 10/2014 | Kimmel | |
| 2016/0368220 | A1* | 12/2016 | Dimatteo | B29C 64/393 |
| 2017/0128184 | A1* | 5/2017 | Sufyan | A61B 5/205 |
| 2017/0203515 | A1* | 7/2017 | Bennett | B29C 64/393 |
| 2017/0246013 | A1* | 8/2017 | Erenstone | B29C 64/386 |
| 2018/0147062 | A1* | 5/2018 | Ay | A61F 2/30942 |
| 2019/0021880 | A1 | 1/2019 | Herr et al. | |
| 2019/0337231 | A1* | 11/2019 | Fan | G06F 30/00 |
| 2020/0337871 | A1* | 10/2020 | Harmon | B33Y 10/00 |

FOREIGN PATENT DOCUMENTS

| | | |
|---|---|---|
| JP | 3089376 U | 10/2002 |
| JP | 2003-299679 A | 10/2003 |
| JP | 2012513219 A | 6/2012 |
| JP | 2016-077853 A | 5/2016 |
| WO | 17123729 A1 | 7/2017 |

OTHER PUBLICATIONS

Extended European search report in corresponding EP 18880653.3 dated Jul. 19, 2021 (pp. 1-7).
English Translation of the International Search Report for PCT/JP2018/042889 dated Jan. 15, 2019.
English Translation of the Written Opinion for PCT/JP2018/042889 dated Jan. 15, 2019.
English Translation of JP-2016-077853, Publication Date: May 16, 2016.
English Translation of JP-2003-299679, Publication Date: Oct. 21, 2003.
English Translation of JPH07031638, Publication Date: Feb. 3, 1995.
English Translation of JP3089376, Publication Date: Oct. 25, 2002.

* cited by examiner

PROSTHESIS SHAPE DATA GENERATION SYSTEM

CROSS-REFERENCE TO RELATED APPLICATIONS

This application claims the benefit of priority under 35 U.S.C. 119(a)-(e) to Japanese patent application numbered JP 2017-223984, filed on Nov. 21, 2017 and entitled "Prosthesis Shape Data Generation," and PCT application numbered PCT/JP2018/042889, filed on Nov. 20, 2018, the entire contents of both of which are incorporated herein by reference.

TECHNICAL FIELD

The present invention relates to a prosthesis shape data generation system, a prosthesis shape data generation method, a prosthesis shape data generation program and a prosthesis generation system for generating shape data on a prosthesis, such as a prosthetic arm or hand, a prosthetic finger or a prosthetic leg or foot, for example.

BACKGROUND ART

In order to restore the shape or function of a missing body part, a prosthesis can be attached to the stump of the missing body part. However, producing such conventional prostheses imposes time, economic or other burdens.

For example, prostheses are customized by orthotists and therefore are expensive. In particular, prostheses need to be renewed once in several years as the body grows or the prothesis wears, and the economic burdens is heavy.

In addition, it generally takes a long time to finish prostheses, which imposes time and economic burdens. Specifically, finishing a prosthesis requires a plurality of visits to a hospital and various manual processes by experts, such as plaster casting and adjustment, and the users generally have to wait for one month or longer.

In addition, in order to properly wear a prosthesis, a process of appropriately fitting the prosthesis to the stump based on experience and expertise of an orthotist or other expert, such as modification of the shape of the prosthesis, is needed, which also imposes time or economic burdens. If the fitting process is not properly performed, and the prosthesis does not properly fit the stump, the stump can be rubbed and damaged, for example.

In order to reduce or eliminate the various burdens described above, various techniques have been proposed. For example, in order to reduce the time burden when producing a prosthesis, Patent Literature 1 discloses a system that facilitates duplication and modification of a prosthesis by centrally managing, on the Internet, data such as attribute information on a user and three-dimensional data on a prosthesis socket produced in the past.

CITATION LIST

Patent Literature

Patent Literature 1: Japanese Utility Model Registration No. 3089376

SUMMARY OF INVENTION

Problem Invention Seeks to Solve

However, the system disclosed in Patent Literature 1 only builds a database of past information on a prosthesis of an individual, and no mention is made of a specific method of designing a prosthesis shape that fits a stump or a method of reducing the time and economic burdens involved with the fitting operation by an orthotist or the like. Therefore, a properly fitted prosthesis cannot be quickly and economically manufactured.

The present invention has been devised in view of the above technical background, and an object of the present invention is to quickly and economically manufacture a prosthesis that fits the shape of a stump of a prosthesis user. Those skilled in the art will readily understand other objects, effects and advantages of the present invention by referring to the following description in this specification.

Solution to Problem

The technical problem described above can be solved by a prosthesis shape data generation system, a prosthesis shape data generation method, a prosthesis shape data generation program and a prosthesis shape data generation network system configured as described below.

Specifically, a prosthesis shape data generation system according to the present disclosure includes: a stump shape data acquisition unit that acquires stump shape data, which is shape data on a stump of a living body; and an estimated prosthesis shape data generation unit that performs an estimation processing by inputting the stump shape data to a machine learning model that has previously learnt a correspondence between a stump shape and a shape of a part or a whole of a prosthesis that fits the stump shape, thereby generating estimated prosthesis shape data that is shape data on a part or a whole of a prosthesis that fits the stump of the living body.

With such a configuration, shape data on a part (such as a socket part) or the whole of a prosthesis that fits a stump can be generated based on shape data on the stump by using the machine learning technique. Therefore, a prosthesis or a part thereof (such as a socket part thereof) that fits a stump can be generated without a high degree of expertise in orthotics, and the time and economic burdens are reduced. The living body described above may be the body of a human being or an animal, for example.

The prosthesis data generation system may further include a modified prosthesis shape data generation unit that permits a modification to the estimated prosthesis shape data generated by the estimated prosthesis shape data generation unit and, if the modification is performed, generates modified prosthesis shape data that is prosthesis shape data resulting from the modification.

With such a configuration, an additional adjustment can be made based on a rough shape based on the estimation result from the learning model, and therefore, a prosthesis or a part thereof that more precisely fits a stump can be produced. The modification described above includes not only a quantitative modification to digital data but also prototyping using a three-dimensional printer device and a three-dimensional scanner device and a physical modification to the prototype.

The prosthesis data generation system may further include: a final shape determination unit that determines the modified prosthesis shape data generated by the modified prosthesis shape data generation unit to be final prosthesis shape data on the part or the whole of the prosthesis that fits the stump of the living body; and a machine learning processing unit that performs a learning process on the machine learning model based on the stump shape data and the final prosthesis shape data to improve an estimation precision of the machine learning model.

With such a configuration, the machine learning is performed based on the final, modified or otherwise refined prosthesis shape data, the estimation precision of the machine learning model can be further improved as the number of samples increases.

The prosthesis shape data generation system may further include: a three-dimensional printer unit that performs three-dimensional printing corresponding to three-dimensional prosthesis shape data based on arbitrary three-dimensional prosthesis shape data; and a three-dimensional scanner unit that scans an arbitrary three-dimensional shape to generate three-dimensional shape data corresponding to the three-dimensional shape, and the modification performed in the modified prosthesis shape data generation unit may be performed by scanning a three-dimensional shape obtained by physically modifying a three-dimensional printed body generated by the three-dimensional printer unit.

With such a configuration, since a physical modification (such as trimming) can be made to the three-dimensional printed body, an intuitive modification based on the accumulated experience concerning orthotics of an expert, such as an orthotist, can be made. In addition, further learning can be performed based on the modified shape data, and therefore the estimation precision of the machine learning model can be appropriately improved.

The prosthesis shape data generation system may further include an additional information acquisition unit that acquires additional information on the living body, and the estimated prosthesis shape data generation unit may further perform an estimation processing by using the stump shape data and the additional information as an input to the machine learning model that has previously learnt a correspondence between a stump shape and additional information and a shape of a part or a whole of a prosthesis that fits the stump shape, thereby generating estimated prosthesis shape data that is shape data on a part or a whole of a prosthesis that fits the stump of the living body.

With such a configuration, since the additional information on the living body is also used for the learning, shape data on a part or the whole of the prosthesis that more precisely fits the stump can be generated.

The prosthesis shape data generation system may further include a three-dimensional shape editing unit that receives arbitrary prosthesis shape data and edits the prosthesis shape data by three-dimensional CAD, and the modification performed in the modified prosthesis shape data generation unit may be performed by the three-dimensional CAD in the three-dimensional shape editing unit.

With such a configuration, since the prosthesis shape data can be edited using three-dimensional CAD, a quantitative modification can be made. In addition, since further learning can be performed based on the modified shape data, the estimation precision of the machine learning model can be appropriately improved.

The present invention can also be embodied as a prosthesis shape data generation network system. Specifically, the prosthesis production system according to the present disclosure includes a local network; and a server connected to the local network via an internet, the local network includes: a three-dimensional scanner unit that scans an arbitrary three-dimensional shape to generate corresponding three-dimensional shape data; and a stump shape data acquisition unit that acquires stump shape data, which is shape data on a stump of a living body generated by the three-dimensional scanner unit, the server includes an estimated prosthesis shape data generation unit that performs an estimation processing by inputting the stump shape data to a machine learning model that has previously learnt a correspondence between a stump shape and a shape of a part or a whole of a prosthesis that fits the stump shape, thereby generating estimated prosthesis shape data that is shape data on a part or a whole of a prosthesis that fits the stump of the living body, the stump shape data acquired by the stump shape data acquisition unit is transmitted to the server via the internet, and the estimated prosthesis shape data generation unit generates the estimated prosthesis shape data based on the stump shape data and transmits the estimated prosthesis shape data to the local network via the internet.

With such a configuration, shape data on a part of a prosthesis (such as a socket part of a prosthesis) or the whole of a prosthesis that fits a stump can be generated based on the shape data on the stump by using the machine learning technology. As a result, a prosthesis or a part thereof (such as a socket) that fits a stump can be produced without a high degree of expertise in orthotics, and the time and economic burdens can be reduced. In addition, the machine learning or the like does not have to be performed on the local network, and the computation load can be distributed. Furthermore, if a plurality of different local networks is connected to the internet, the stump shape data or the like obtained in each local network can be centralized in the server. As a result, the machine learning can be performed based on various patterns, and the estimation precision can be further improved.

The present disclosure can also be embodied as a method. Specifically, a prosthesis shape data generation method according to the present disclosure includes: a stump shape data acquisition step of acquiring stump shape data, which is shape data on a stump of a living body; and an estimated prosthesis shape data generation step of performing an estimation processing by inputting the stump shape data to a machine learning model that has previously learnt a correspondence between a stump shape and a shape of a part or a whole of a prosthesis that fits the stump shape, thereby generating estimated prosthesis shape data that is shape data on a part or a whole of a prosthesis that fits the stump of the living body.

The present disclosure can also be embodied as a computer program. Specifically, a prosthesis shape data generation program according to the present disclosure is a prosthesis shape data generation program that makes a computer perform: a stump shape data acquisition step of acquiring stump shape data, which is shape data on a stump of a living body; and an estimated prosthesis shape data generation step of performing an estimation processing by inputting the stump shape data to a machine learning model that has previously learnt a correspondence between a stump shape and a shape of a part or a whole of a prosthesis that fits the stump shape, thereby generating estimated prosthesis shape data that is shape data on a part or a whole of a prosthesis that fits the stump of the living body.

Advantageous Effects of Invention

According to the present disclosure, shape data on a part of a prosthesis (such as a socket part of a prosthesis) or the whole of a prosthesis that fits a stump can be generated based on shape data on the stump by using a machine learning technology. Therefore, a prosthesis or a part thereof (such as a socket) that fits a stump can be produced without a high degree of expertise in orthotics, and the time and economic burdens can be reduced.

DESCRIPTION OF EMBODIMENT

In the following, a prosthesis shape data generation system, a prosthesis shape data generation method, a prosthesis shape data generation program, and a prosthesis shape data generation network system according to an embodiment of the present disclosure will be described in detail with reference to the accompanying drawings.

1. First Embodiment

With reference to FIGS. 1 to 6, a first embodiment will be described.

<1.1 Configuration of System>

Figure 1:
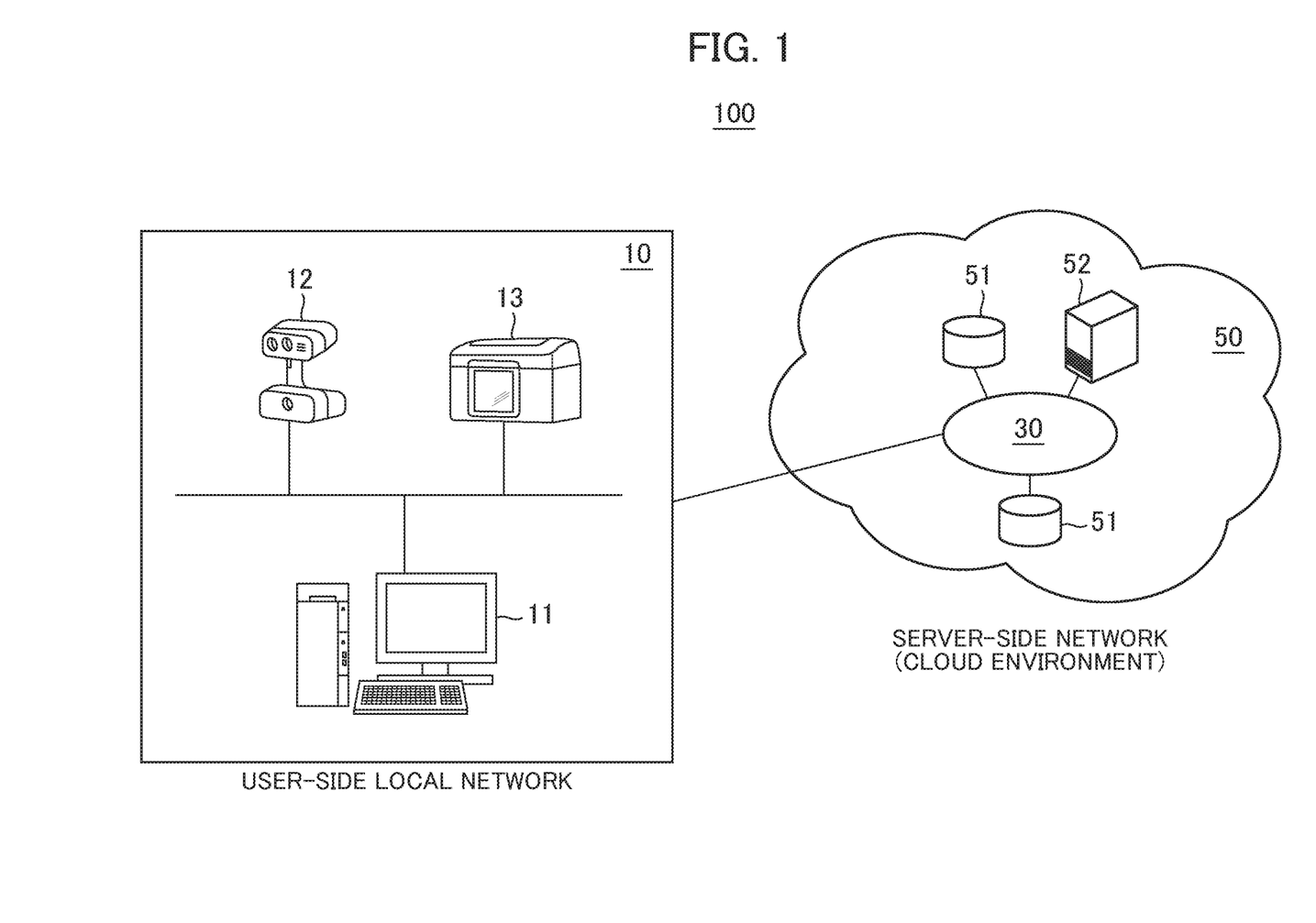
FIG. 1 is a conceptual diagram showing the whole of a network system.

First, with reference to FIG. 1, a general configuration of a prosthesis shape data generation system 100 according to this embodiment will be described.

The prosthesis shape data generation system 100 includes a local network 10 and a server system 50, the local network 10 is formed by an interconnection of an information processing device 11 that includes a CPU or GPU for performing various controls, a memory and an input/output device, such as a keyboard or a display, and performs various information processings described later, a three-dimensional scanner device 12 (such as a 3D scanner) that scans an arbitrary three-dimensional shape to generate three-dimensional shape data, and a three-dimensional printer device 13 (such as a 3D printer) that prints a three-dimensional shape based on arbitrary three-dimensional shape data, and the server system 50 is connected to the local network 10 via the Internet 30 and is formed by a storage device 51 that stores various kinds of information described later and a server device 52 that includes a control unit, a storage unit and the like and performs a machine learning process or the like described later. The server system 50 is in a so-called cloud environment, and the server device 52 may perform distributed processing or processing under virtualization in a predetermined manner, for example. The storage device 51 does not have to be located at one location and may be distributed or configured as a predetermined storage system, for example.

<1.2 Operation of System>

Next, with reference to FIGS. 2 to 5, an example of an operation of the prosthesis shape data generation system 100 shown in FIG. 1 will be described.

Figure 2:
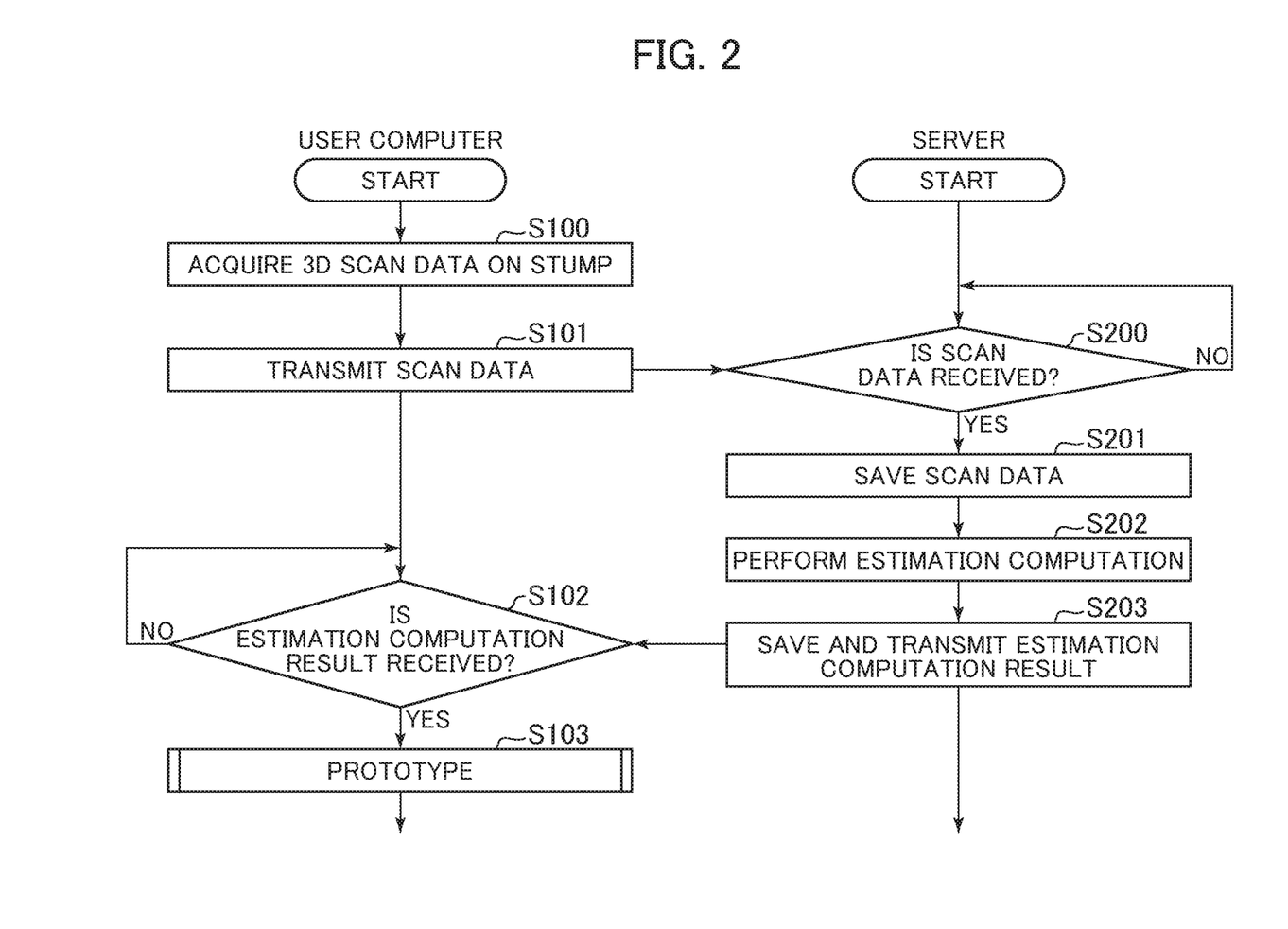
FIG. 2 is a (first) diagram for illustrating an example of an operation of the network system.
Figure 3:
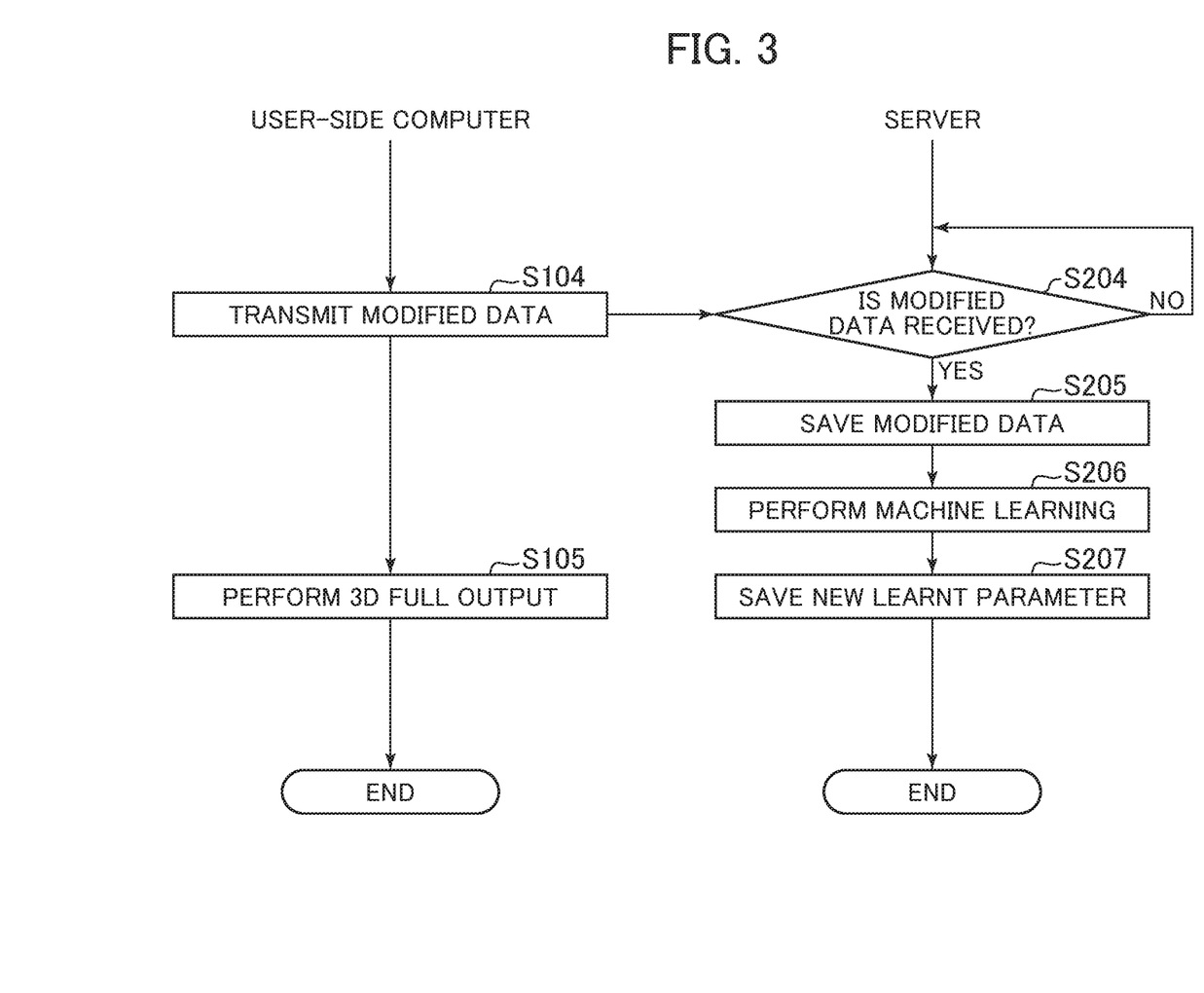
FIG. 3 is a (second) diagram for illustrating the example of the operation of the network system.

FIGS. 2 and 3 shows an example of an operation of the prosthesis shape data generation system 100. The left halves of the drawings show processings performed in the local network 10, and the right halves of the drawings show processings performed in the server system 50.

In FIG. 2, when a process is started, the information processing device 11 performs a processing of acquiring three-dimensional stump scan data generated by the three-dimensional scanner device 12 scanning a stump of a human body (S100), and transmits the acquired stump scan data to the server system 50 via the internet 30 (S101). After the transmission, the information processing device 11 waits until the information processing device 11 receives an estimation computation result described later (as far as No in S102).

After the process is started, when the server device 52 that is waiting until the server device 52 receives the stump scan data (as far as NO in S200) receives the stump scan data from the information processing device 11 (if YES in S200), the server device 52 saves the received stump scan data in the storage unit of the server device 52 or the storage device 51 (S201). The server device 52 then inputs the stump scan data to a learning model, which has previously leant the correspondence between s stump shape and the shape of a part of a prosthesis that fits the stump shape, the shape of a prosthesis socket in this embodiment, to perform an estimation computation processing for estimating prosthesis socket shape data that fits the stump shape (S202). The result of the estimation computation processing, that is, the prosthesis socket shape data that fits the stump, is transmitted to the information processing device 11 (S203) and the prosthesis socket shape data corresponding to the estimation computation result is saved in the storage unit of the server device 52 or the storage device 51. As described later, the learning model can be any of various types of learning models. In this embodiment, as an example, an artificial neural network is used as the learning model.

When the information processing device 11 receives the estimation computation result from the server device 52 (if YES in S102), modification and prototyping process of a prosthesis socket shape data corresponding to the estimation computation result is performed (S103).

Figure 4:
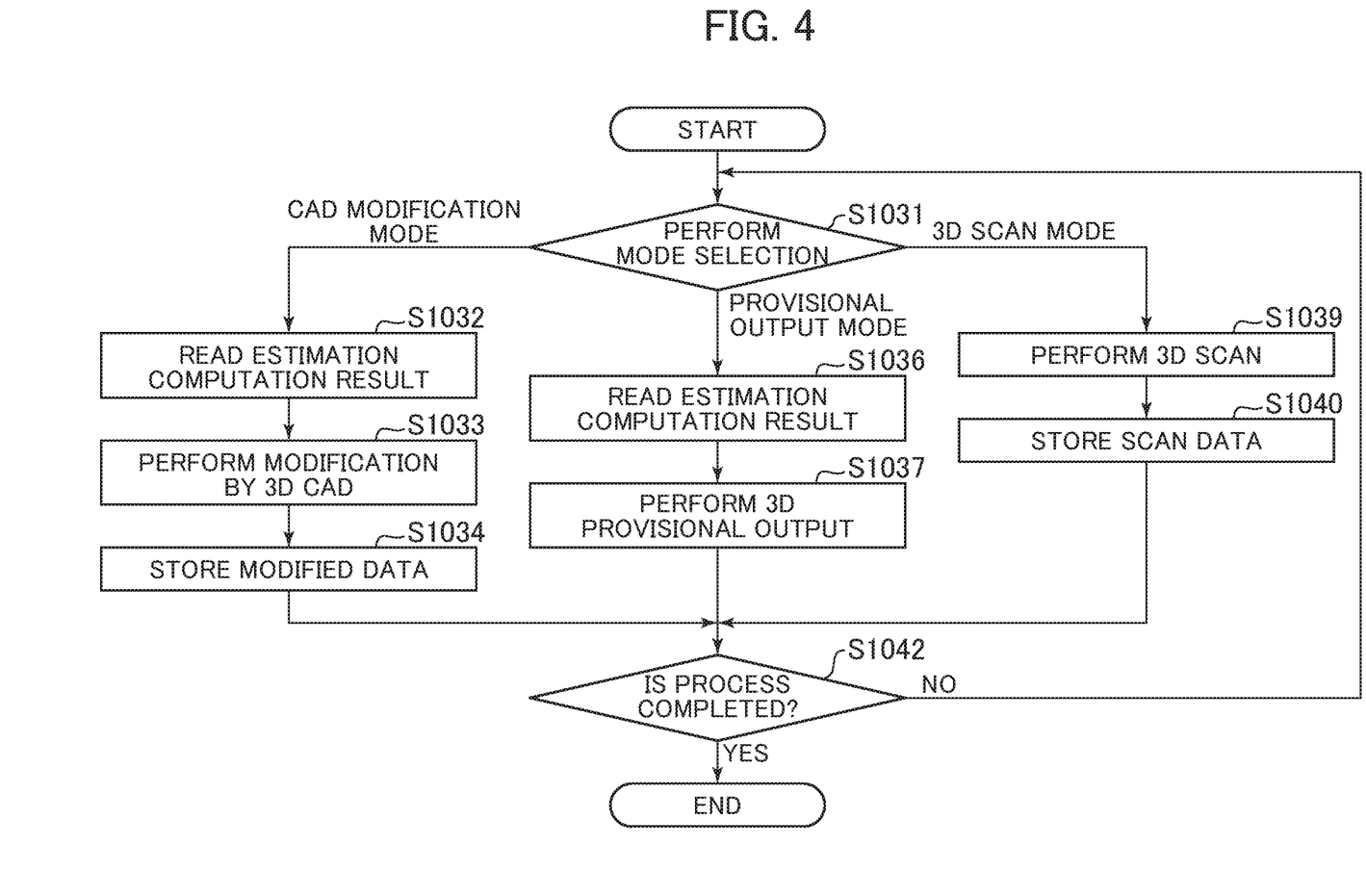
FIG. 4 is a detailed flowchart showing a modification process.

FIG. 4 shows a flow of the prototyping process in detail. As is obvious from the drawing, once the information processing device 11 starts the prototyping process, a mode selection processing occurs in which a user is prompted to perform mode selection via a GUI or the like on the display (S1031). As is obvious from the drawing, there are three modes, specifically, a "CAD modification mode" in which the prosthesis socket shape data corresponding to the estimation computation result (or the latest or selected prosthesis socket shape data in the case where the prototyping process or the like has previously been performed) is modified using three-dimensional CAD, a "provisional output mode" in which the three-dimensional printer device 13 provisionally outputs the estimation computation result (or the latest or selected prosthesis socket shape data in the case where the prototyping process or the like has previously been performed), and a "3D scan mode" in which the three-dimensional scanner device 12 scans a predetermined prosthesis socket or the provisionally output prosthesis socket again. The three-dimensional printer device 13 may perform the printing in a simplified mode in which output is completed in about several (two to three) hours, since the output is provisional output.

If the "CAD modification mode" is selected in the mode selection processing (S1031), the estimation computation result (or the latest or selected prosthesis socket shape data in the case where the prototyping process or the like has previously been performed) is read (S1032). A processing is then performed to permit or prompt editing of the read prosthesis socket shape data using three-dimensional CAD (S1033). The edited data is stored in the storage unit of the information processing device 11 (S1034). That is, in the "CAD modification mode", the prosthesis shape can be quantitatively modified on the information processing device 11.

If the "provisional output mode" is selected in the modification mode selection processing (S1031), the estimation computation result (or the latest or selected prosthesis socket shape data in the case where the prototyping process or the like has previously been performed) is read (S1036). A processing is then performed in which the three-dimensional printer device 13 three-dimensionally outputs the read prosthesis socket shape data (S1037). The three-dimensional printer device 13 may perform the printing in a simplified mode in which output is completed in about several (two to three) hours, since the output is provisional output.

If the "3D scan mode" is selected in the modification mode selection processing (S1031), a processing is performed in which three-dimensional scanning of a predetermined prosthesis socket or a prosthesis socket that is a provisionally output printed body is performed (S1039). The shape data obtained by the three-dimensional scanning is stored in the storage unit of the information processing device 11 (S1040).

That is, the prosthesis socket shape that is a three-dimensional printed body provisionally output (prototyped) by the "provisional output mode" can be physically modified (trimmed, for example), and then the modified prosthesis socket shape can be converted into three-dimensional shape data again by the "3D scan mode". Therefore, an intuitive modification based on the accumulated experience or expertise of an expert, such as an orthotist, can also be made.

The three modes described above, that is, the "CAD modification mode", the "provisional output mode" and the "3D scan mode" are performed until the prosthesis socket shape fits, or is determined to fit, the stump (until NO in S1042). When the series of processings is completed (if YES in S1042), the prototyping process ends, and the resulting prosthesis socket shape is designated as final prosthesis socket shape data.

With reference to FIG. 3, an example of an operation after the prototyping process (S103) in FIG. 2 is completed will be described. As is obvious from the drawing, the modified prosthesis socket shape data after the prototyping process is transmitted from the information processing device 11 to the server device 52 (S104). In this step, if no modification has been made to the estimation computation result in the prototyping process, a signal indicating that no modification has been made is transmitted from the information processing device 11 to the server device 52. After the transmission to the server device 52, a processing is performed to allow the three-dimensional printer device 13 to perform full output (S105). As the full output, the three-dimensional printer device 13 may perform precise three-dimensional printing over more than ten hours (such as 12 to 24 hours), for example.

With this configuration, if no modification is required, only the signal indicating that no modification has been made is transmitted to the server device 52. Therefore, a relatively large amount of data, such as the prosthesis socket shape data, does not need to be transmitted, and the processing load can be reduced.

On the other hand, in the drawing, if the server device 52 that is waiting until the server device 52 receives the modified prosthesis socket shape data (as far as NO in S204) receives the modified prosthesis shape data from the information processing device 11 (if YES in S204), the server device 52 first saves the modified prosthesis shape data in the storage unit therein or the storage device 51 (S205). The server device 52 then reads the estimation computation result saved (in S203) and the modified prosthesis socket shape data, and performs a machine learning process for learning the correspondence therebetween (S206). When the machine learning process is completed, a learnt parameter (weight or the like) is saved in the storage unit of the server device 52 or the storage device 51 (S207), and the process ends.

If the server device 52 receives the signal indicating that no modification has been made, rather than the modified prosthesis socket shape data, from the information processing device 11 (if YES in S204), the process ends without performing the processing of saving the modified data (S205) and the machine learning process (S206 and S207). This is because it is determined that the precision of the estimation processing is sufficient, and further machine learning is not needed. Although the machine learning is not performed if the server device 52 receives the signal indicating that no modification has been made in this embodiment, the machine learning can also be performed using the data that does not need to be modified, in order to reinforce the parameter used when outputting the data of high estimation precision.

Figure 5:
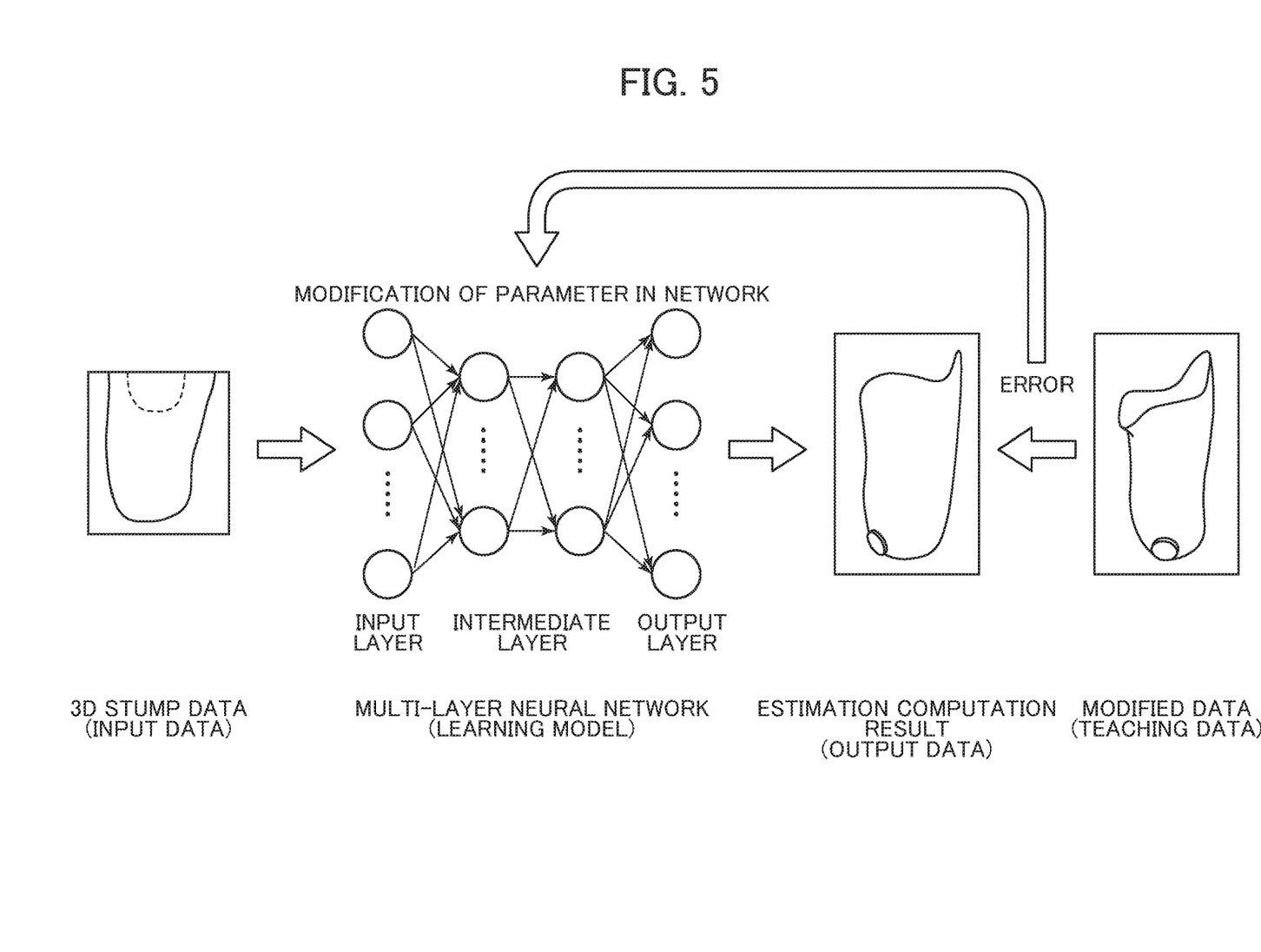
FIG. 5 is a conceptual diagram showing a learning process using a neural network.

FIG. 5 is a conceptual diagram showing an example of the machine learning process, in particular, the machine learning process performed using an artificial neural network. The artificial neural network used in this embodiment is a multi-layer artificial neural network having an input layer, a plurality of intermediate layers and an output layer, and is formed by nodes, which correspond to neurons, and weighted links (weights), which correspond to synapses responsible for transmission between neurons and connect nodes to each other, as shown in the middle part of the drawing. With such an artificial neural network, based on an input data set and a teaching data set, a parameter such as a numeric value corresponding to a weight is updated (supervised learning), and correspondences between various inputs and outputs can be learnt. Note that the illustration of the example in the drawing is simplified in number of neurons or the like for the ease of understanding.

Next, the machine learning process using the artificial neural network according to this embodiment (S206) will be described. The machine learning process includes a forward computation processing and an error back propagation computation processing.

First, the forward computation processing will be described. Once the forward computation processing is started, the three-dimensional shape data on the stump or data corresponding thereto is input to the input layer shown in the left part of the drawing. In this embodiment, the stump is a below-knee stump. In response to the input, the firing values of the neurons are computed based on the weights between the nodes, and a forward propagation occurs from left to right in the drawing. In this step, as a transfer function for each neuron, a ramp function (ReLU) or a sigmoid function can be used, for example. When the forward propagation reaches the output layer shown in the right part of the drawing, the three-dimensional shape data on the part (socket) of the prosthesis corresponding to the estimation computation result is presented at the output layer. In this way, the estimation machine (learning model) outputs the three-dimensional shape data on the part (socket) of the prosthesis from the three-dimensional shape data on the stump or data corresponding thereto.

When the error back propagation computation processing is started, the forward computation is first performed, and then, a processing is performed in which an error is calculated between the three-dimensional shape data on the prosthesis socket corresponding to the estimation computation result and the modified prosthesis socket shape data corresponding to teaching data received from the information processing device 11. The error calculated in this processing propagates to the input layer according to the error back propagation algorithm, and the parameter such as the numeric value corresponding to the weight is updated or modified based on the back-propagated error. The learning model performs such a series of processings on many various pairs of input data and teaching data, thereby learning the expertise of the orthotist or other person who has modified the shape data. As a result, the estimation precision of the learning model is gradually improved.

That is, with such a configuration, a part of a prosthesis (such as a socket part of a prosthesis) that fits a stump can be produced based on the shape data on the stump by using the machine learning technology. As a result, a prosthesis or a part thereof (such as a socket) that fits a stump can be produced without a high degree of expertise in orthotics, and the time and economic burdens can be reduced.

In addition, since the machine learning is performed based on the final prosthesis socket shape data, considering modification etc., the estimation precision of the machine learning model can be further improved as the number of samples increases.

Figure 6:
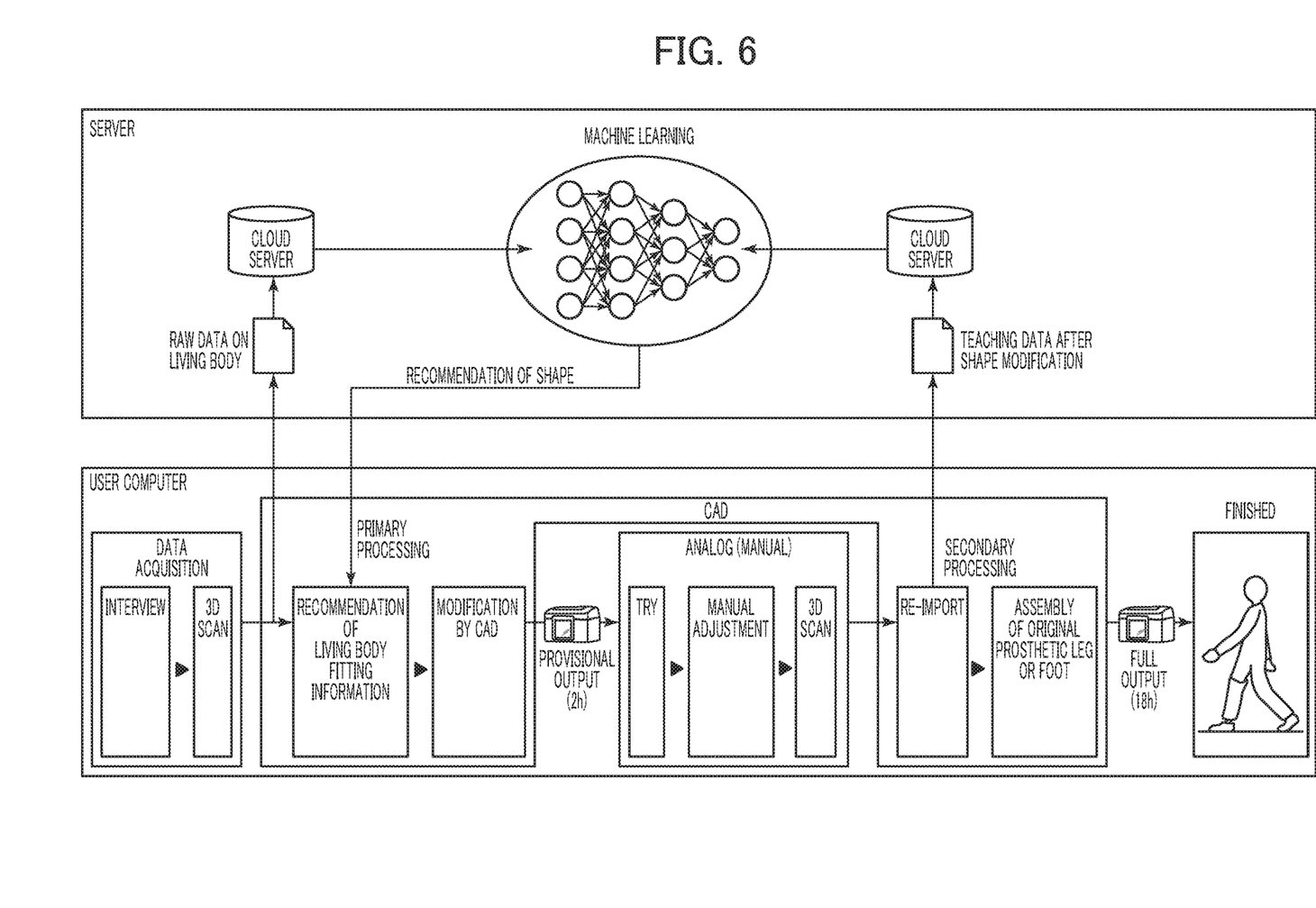
FIG. 6 is a diagram for illustrating an overview of the system.

FIG. 6 is a diagram for illustrating an overview of the prosthesis socket shape data generation system 100 described above. With reference to the drawing, an example of a process will be described in which a prosthesis provider uses the prosthesis shape data generation system 100 to provide a prosthesis to a prosthesis user.

As is obvious from the drawing, the prosthesis provider first interviews the prosthesis user, and then uses the three-dimensional scanner device 12 to scan the three-dimensional shape of the stump of the prosthesis user. After the scanning, the prosthesis provider transmits the three-dimensional shape data on the scanned stump to the server device 52 (S100, S101). The three-dimensional shape data on the scanned stump is uploaded to the server device 52 in the cloud environment and input to the estimation machine (learning model), and the estimation machine (learning model) estimates and computes the three-dimensional data on the prosthesis socket (S200 to S202). The estimation computation result, that is, the three-dimensional shape data on the prosthesis socket, is transmitted and recommended to the information processing device 11 of the prosthesis provider (S203).

The estimation computation result, that is, the three-dimensional shape data on the prosthesis socket, is then displayed on a display or the like of the information processing device 11 and is provided for modifications by the prosthesis provider (S103). The modifications include both digital or quantitative modifications using three-dimensional CAD (S1032 to S1034) and analog modifications including provisional output by the three-dimensional printer device 13 (S1036 to S1037), a physical modification (such as trimming) to the provisionally output printed body and the subsequent scanning of the modified printed body (S1039 to S1040). When the modifications are completed (S1042), the modified three-dimensional prosthesis shape data on the prosthesis socket is transmitted and imported to the server device 52 (S104, S204 to S205). After that, the modified three-dimensional shape data on the prosthesis socket is fully output by the three-dimensional printer device 13 (S105), other components are assembled to the output prosthesis, and the finished prosthesis is provided to the prosthesis user.

On the other hand, the learning model on the server device 52, that is, the artificial neural network, performs a learning process using the shape of the stump of the prosthesis as an input and the modified three-dimensional shape data on the prosthesis socket as teaching data (S206 to S207). In this way, the estimation precision of the learning model can be further improved.

2. Variations

In the embodiment described above, the machine learning is performed using the stump shape of the prosthesis as an input and the modified three-dimensional prosthesis shape data on the prosthesis socket as teaching data. However, the present disclosure is not limited to the implementation. For example, the whole of the prosthesis may be output, rather than a part of the prosthesis, such as the prosthesis socket. Furthermore, additional information on the properties of the prosthesis user, such as age, sex, weight, muscle mass, body fat mass, soft tissue mass, position of the bone of the stump, or pigeon-toed/bow-legged or anteversion/retroversion in the case of a prosthetic leg or foot, may be obtained in the interview, input to the information processing device 11 and transmitted to the server device 52, and the learning process may be performed by using the additional information and the shape of the stump as inputs and the modified three-dimensional shape data on the prosthesis socket as teaching data. With such a configuration, since the additional information on the prosthesis user is also used for the learning, shape data on a part or the whole of the prosthesis that more precisely fits the stump can be generated.

In the embodiment described above, a simple artificial neural network is used. However, the present disclosure is not limited to the implementation. Various other machine learning algorithms that gradually acquire a generalization capability, such as a support vector machine (SVM), can also be used. Even when the artificial neural network is used, a fully connected neural network may be used, or a convolutional neural network (CNN) or the like may be arranged before or after the artificial neural network, for example. Furthermore, instead of sequentially performing the learning process for each data set, the learning process may be performed for each batch of a plurality of patterns accumulated. Furthermore, instead of the simple multi-layer structure, a structure having an increased number of intermediate layers may be used to perform deep learning.

Furthermore, in the embodiment described above, the stump shape data or the prosthesis shape data itself is transmitted as three-dimensional data between the information processing device 11 and the server device 52. However, the present disclosure is not limited to the implementation. For example, an appropriate information compression or data structure conversion may be performed for transmission, in order to reduce the amount of information. Furthermore, the transmission may be performed after the data is converted into a format suitable for machine learning.

Furthermore, in the embodiment described above, the devices are divided into those in the local network 10 and those in the server system 50. However, the network configuration is not limited to such a configuration but can be modified. For example, all the processes according to the present invention including the machine learning process may be performed in the local network 10, or the three-dimensional scanner device 12 and the three-dimensional printer device 13 may be located in different networks. Furthermore, all the processes according to the present disclosure including the machine learning process may be performed in one information processing device 11.

INDUSTRIAL APPLICABILITY

The present disclosure can be used at least in the prosthesis manufacturing industry and associated industries.

REFERENCE SIGNS LIST 10 local network
11 information processing device
12 three-dimensional scanner device
13 three-dimensional printer device
30 Internet
50 server system
51 storage device
52 server device
100 prosthesis shape data generation system

The invention claimed is:
1. A prosthesis shape data generation system, comprising:
a stump shape data acquisition unit that acquires stump shape data, which is shape data on a stump of a living body;
an estimated prosthesis shape data generation unit that performs an estimation processing by inputting the stump shape data to a machine learning model that has previously learnt a correspondence between a stump shape and a shape of a part or a whole of a prosthesis that fits the stump shape, thereby generating estimated prosthesis shape data that is shape data on a part or a whole of a prosthesis that fits the stump of the living body;
a modified prosthesis shape data generation unit that permits a modification to the estimated prosthesis shape data and, if the modification is performed, generates modified prosthesis shape data that is prosthesis shape data resulting from the modification; a
a three-dimensional printer unit that performs three-dimensional printing corresponding to three-dimensional prosthesis shape data based on arbitrary three-dimensional prosthesis shape data;
a three-dimensional scanner unit that scans an arbitrary three-dimensional shape to generate three-dimensional shape data corresponding to the three-dimensional shape;
wherein the modification performed in the modified prosthesis shape data generation unit is performed by scanning, with the three-dimensional scanner, a three-dimensional shape obtained by physically modifying a three-dimensional printed body generated by the three-dimensional printer unit;
a final shape determination unit that determines, when the modification is not performed, the estimated prosthesis shape data to be final prosthesis shape data and, when the modification is performed, the modified prosthesis shape data to be the final prosthesis shape data; and
a machine learning processing unit that performs a learning process on the machine learning model based on the stump shape data and the final prosthesis shape data to improve an estimation precision of the machine learning model.

2. The prosthesis shape data generation system according to claim 1, further comprising:
a three-dimensional shape editing unit that receives arbitrary prosthesis shape data and edits the prosthesis shape data by three-dimensional CAD,
wherein the modification performed in the modified prosthesis shape data generation unit is performed with the three-dimensional CAD.

3. The prosthesis shape data generation system according to claim 1, further comprising:
a three-dimensional shape editing unit that receives arbitrary prosthesis shape data and edits the prosthesis shape data by three-dimensional CAD, and
wherein the modification performed in the modified prosthesis shape data generation unit is performed by scanning, by the three-dimensional scanner, a three-dimensional shape obtained by physically modifying a three-dimensional printed body generated by the three-dimensional printer unit, or by the three-dimensional CAD in the three-dimensional shape editing unit.

4. The prosthesis shape data generation system according to claim 1,
wherein the machine learning processing unit is configured not to perform the learning process when the estimated prosthesis shape data is determined to be the final prosthesis shape data in the final shape determination unit.

5. A prosthesis shape data generation method that generates prosthesis shape data with a system, comprising:
a stump shape data acquisition step of acquiring stump shape data, which is shape data on a stump of a living body;
an estimated prosthesis shape data generation step of performing an estimation processing by inputting the stump shape data to a machine learning model that has previously learnt a correspondence between a stump shape and a shape of a part or a whole of a prosthesis that fits the stump shape, thereby generating estimated prosthesis shape data that is shape data on a part or a whole of a prosthesis that fits the stump of the living body; and
a modified prosthesis shape data generation step of permitting a modification to the estimated prosthesis shape data generated by the estimated prosthesis shape data generation step and, if the modification is performed, generating modified prosthesis shape data that is prosthesis shape data resulting from the modification,
the system further comprising:
a three-dimensional printer unit that performs three-dimensional printing corresponding to three-dimensional prosthesis shape data based on arbitrary three-dimensional prosthesis shape data; and
a three-dimensional scanner unit that scans an arbitrary three-dimensional shape to generate three-dimensional shape data corresponding to the three-dimensional shape,
wherein the modification performed in the modified prosthesis shape data generation step is performed by scanning, with the three-dimensional scanner, a three-dimensional shape obtained by physically modifying a three-dimensional printed body generated by the three-dimensional printer unit,
the method further comprising:

determining, when the modification is not performed, the estimated prosthesis shape data to be final prosthesis shape data and, when the modification is performed, the modified prosthesis shape data to be the final prosthesis shape data; and performing a learning process on the machine learning model based on the stump shape data and the final prosthesis shape data to improve an estimation precision of the machine learning model.

6. The prosthesis shape data generation method of claim 5, wherein the method is performed by a program stored on a non-transitory computer readable medium.

* * * * *